UNITED STATES PATENT OFFICE.

KNUD ERSLEV, OF NIJMEGEN, NETHERLANDS.

MANUFACTURE OF MARGARIN.

1,216,675.     Specification of Letters Patent.     Patented Feb. 20, 1917.

No Drawing.     Application filed November 13, 1916. Serial No. 131,000.

*To all whom it may concern:*

Be it known that I, KNUD ERSLEV, a subject of the King of Denmark, residing at Nijmegen, in the Kingdom of the Netherlands, have invented new and useful Improvements in the Manufacture of Margarin, of which the following is a specification.

In manufacturing margarin in the usual way, buttery aroma is imparted thereto by mixing and working into an emulsion therewith, milk, cream, or the like, in which an aromatic flavor has been developed by fermentation, a further quantity of such aromatized milk, cream, or the like, being, if necessary, added to the finished margarin. The aromatized flavoring substances which are developed by such additions are volatile, and liable to readily alter, when the margarin is kept for some time, and care has to be taken that, in the finished margarin an after fermentation will take place to form further aromatic substances, but, although in this way the objections are met to a certain extent, they are not completely overcome, and it has been one of the most important problems to satisfactorily retain the buttery aroma imparted to the margarin.

According to my United States Patent No. 1,147,626 this problem is satisfactorily solved by the addition of a lactate of an alkali to the fat.

I have now found that the buttery aroma can also be very efficiently and economically preserved by adding an earth alkali salt of a saturated oxy fatty acid. I have obtained good results with the glycolates and lactates of the aforesaid bases, as far as such salts are sufficiently soluble in water. Mixtures of any of the aforesaid earth alkali salts may be used and are included under my claims. For example a magnesium salt may be somewhat soluble, but not sufficiently so, and it may therefore be used in mixture with another of the aforesaid salts of the same or another acid, which is more soluble, say a calcium salt, for to be useful for the purpose of my invention the salt, or mixture of salts, employed should be sufficiently soluble in water to give the intended effect.

In carrying out the invention, aforesaid salt, or mixture of salts, is added to the fat which has been emulsified with the fermented aromatized milk, cream, or the like, the mass after cooling being freed from an excess of water by rolling, kneading, or other suitable means. The aforesaid salt, or mixture of salts, can be added in the condition of a fine powder, or as a concentrated solution together with the ingredients (such as egg yolk, cream or the like), which may be added to the emulsion in the mixer.

The said salt, or mixture of salts, may be added to the fat in different quantities, according to the effect required. The quantity employed may be as little as one tenth of one per cent. relatively to the fat. If desired common salt can be added as usual in addition to the aforesaid salt, or mixture of salts.

The salts employed should be innocuous as food and therefore the salts of barium and strontium are excluded, but I include under my claims the saturated oxy-fatty acid salts of magnesium.

The following is an example of how my invention may be performed, but I do not limit myself to this example.

*Example.*

100 kilograms of a suitable fat are emulsified in a mixer with the required quantity of fermented aromatized milk and other usual, or suitable, ingredients as desired while, during the emulsifying, one fifth of a kilogram of a finely powdered mixture (consisting of four parts by weight of calcium lactate and one part by weight of magnesium lactate) is added. After emulsifying and cooling, the mass is rolled, or kneaded, which can be done in any suitable way.

What I claim is:—

1. In the manufacture of margarin, the addition of an earth alkali salt of a saturated aliphatic oxy acid for the purpose of preserving the buttery aroma of the margarin.

2. In the manufacture of margarin, the addition of an earth alkali salt of a saturated aliphatic oxy acid, in amount not less than one tenth of one per cent. relatively to the fat, for the purpose of preserving the buttery aroma of the margarin.

3. In the manufacture of margarin, the addition of magnesium lactate for the purpose of preserving the buttery aroma of the margarin.

4. In the manufacture of margarin, the addition of magnesium lactate, in amount not less than one tenth of one per cent. relatively to the fat, for the purpose of preserving the buttery aroma of the margarin.

In testimony whereof I have signed my name to this specification.

KNUD ERSLEV.